L. M. HARTWICK.
MOISTURE PRODUCING AND REGULATING DEVICE.
APPLICATION FILED APR. 24, 1908.
917,863.
Patented Apr. 13, 1909.
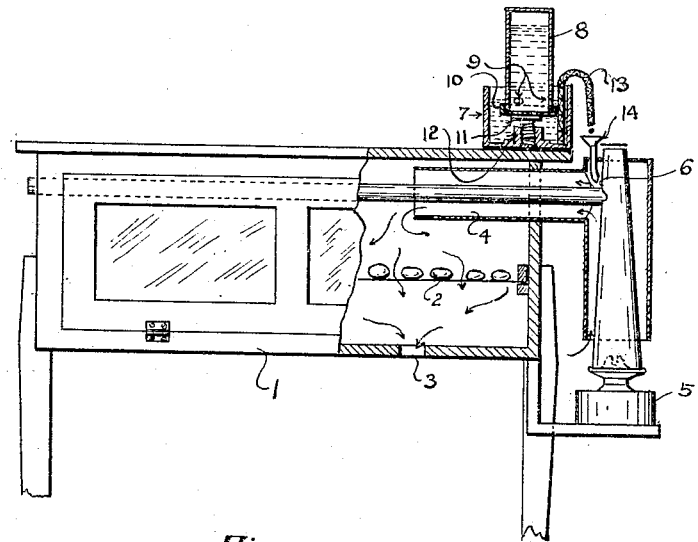
Fig. 1
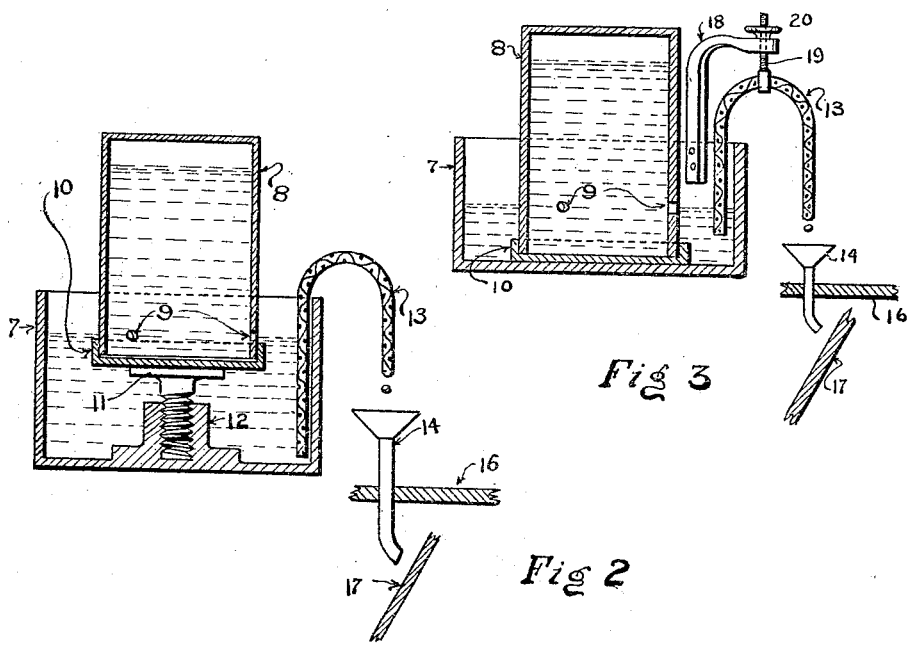
Fig. 2
Fig. 3
Witnesses
Richard Wissa
Julius Nicolaus
Inventor
Louis Martin Hartwick

UNITED STATES PATENT OFFICE.

LOUIS MARTIN HARTWICK, OF PUEBLO, COLORADO.

MOISTURE PRODUCING AND REGULATING DEVICE.

No. 917,863.

Specification of Letters Patent.

Patented April 13, 1909.

Application filed April 24, 1908. Serial No. 429,095.

*To all whom it may concern:*

Be it known that I, LOUIS MARTIN HARTWICK, a citizen of the United States, residing at Pueblo, in the county of Pueblo and the State of Colorado, have invented a new and useful moisture producing and regulating device to be applied where air is raised in temperature for the benefit of animal or vegetable life, of which the following is a specification.

My invention relates to the improvement in furnishing moisture, and regulating the same, where hot air is furnished to a room or chamber. It is well known that where air is raised in temperature it loses its moisture very rapidly so moisture must be furnished—in dwellings for comfort, in the incubation of eggs to prevent excessive drying, and for the health of chicks in brooders, therefore the object of my invention is to produce moisture in the hot air furnished to a chamber and to regulate the same to any desirable degree. I attain these objects by the mechanisms illustrated in the accompanying drawings, in which:

Figure 1 is a vertical view of an incubator in partial broken section, showing the moisture device as applied, for furnishing moisture to an incubator or brooder. Fig. 2 is a vertical view of my invention, showing method of regulating the moisture by raising or lowering the reservoir. Fig. 3 is a vertical view of my invention showing another method of regulating the moisture.

Similar numbers refer to similar parts throughout the several views.

The incubator chamber (1), a common type of what is known as a hot air machine, suitably lined, having egg trays, doors, etc., constitutes the supporting frame where my invention is to be supplied to incubators or brooders.

The open vessel (7), containing water, rests on top of the machine. In this vessel, and supported on the adjusting screw (11), is an inverted jar or reservoir (8). On the open end of jar (8) is a cap (10). Jar (8) and cap (10) are not attached to screw (11), but being loose can be lifted out and jar (8) filled with water.

Near the open end of jar (8) are one or more small holes (9). On or near the same horizontal plane, jar (8) is filled with water, cap (10) placed, then inverted and set on screw (11). Air will then enter holes (9) and displace some of the water which will escape into vessel (7) until the water level in vessel (7) is approximately on the line of the holes (9), so if adjusting screw (11) is moved up, or is unscrewed out of the nut (12), which may or may not be a part of vessel (7), the water level in vessel (7) will move up, and if adjusting screw (11) is screwed down the water level in vessel (7) will be lowered.

Fig. 13 constitutes a wick of fibrous material bent into a "U" shape, and may be supported by hanging over the edge of vessel (7). One end is immersed in the water in vessel (7) and the other end is free, thus forming a capillary feed, so water will be slowly fed out of vessel (7) and drop off the end of wick (13). This water dropping off of wick (13) is conveyed through the funneled tube (14) which is shown in Fig. (1). This allows the drop of water to strike against the hot chimney (6) where it will be immediately converted into steam. The hot air passing up around chimney (6) and entering the incubator through tube (4) will take up the moisture thus formed and will carry it downward through the eggs in tray (2) and out of the hole (3).

Fig. 2 shows my invention as applied in a general way—(16) being a support for funneled tube (14) and (17) a hot surface where the drops of water from the wick (13) will strike and be evaporated. When the water in vessel (7) is raised, more water will be siphoned over and dropped on the hot plate and if the water level in vessel (7) is lowered, less water will be siphoned over and as a result less moisture furnished.

Fig. 3 is another arrangement to accomplish the same result. Reservoir (8) rests on the bottom of vessel (7) or on a stationary support, so the water level in vessel (7) is stationary, and adjustment in the flow of water in the capillary feed is made by raising or lowering the wick (13) by means of adjusting screw (19) with nut (20), giving the same result as in Fig. 2, the object being in each case to regulate the flow of water by moving the distance between the water level in vessel (7) to the top of the band in the capillary feed.

Having thus described my invention, what I claim is—

1. The combination of a tank adapted to hold water: an evaporating surface, adjacent to and below the tank, so heated that water coming into contact with or near this surface would be evaporated: absorbent material, one end of which enters the tank, the other terminating near the heating surface, substantially as described and for the purpose set forth.

2. The combination of a tank adapted to hold water: an evaporating surface, adjacent to and below the tank, so heated that water coming in contact with, or near this surface, would be evaporated: absorbent material, one end of which enters the tank, the other terminating near the heating surface: and an inverted jar or reservoir with holes near the open end, so that as water is drawn from the tank it will be replenished from the reservoir, substantially as described.

3. The combination of a tank adapted to hold water; an evaporating surface, adjacent to and below the tank, so heated that water coming in contact with or near this surface would be evaporated: absorbent material, one end of which enters the tank, the other terminating near the heating surface, and an inverted jar or reservoir, whereby water is supplied to the tank, this jar or reservoir so supported that it may be adjusted in height and so raise or lower the water lever in the tank and thus regulate the flow of water in the absorbent material.

4. The combination of a tank adapted to hold water; an evaporating surface, adjacent to and below the tank, so heated that water coming in contact with or near this surface would be evaporated; an inverted jar or reservoir, whereby the water is supplied to the tank, absorbent material, one end of which enters the tank, the other terminating near the heating surface, this absorbent material supported so that it may be raised or lowered, thereby regulating the flow of water through this material, all substantially as described and for the purpose set forth.

In testimony whereof, I have signed my name to this specification in the presence of two subscribing witnesses.

LOUIS MARTIN HARTWICK.

Witnesses:
RICHARD WESSA,
JULIUS NICOLAUS.